(12) United States Patent
Lee et al.

(10) Patent No.: US 10,320,466 B2
(45) Date of Patent: Jun. 11, 2019

(54) APPARATUS AND METHOD FOR ESTIMATING PARAMETER OF MULTI PATH SIGNAL

(71) Applicant: ELECTRONICS AND TELECOMMUNICATIONS RESEARCH INSTITUTE, Daejeon (KR)

(72) Inventors: Juyul Lee, Daejeon (KR); Myung Don Kim, Daejeon (KR); Jinup Kim, Daejeon (KR); Hyun Kyu Chung, Daejeon (KR); Minuk Kim, Busan (KR); Jubum Kim, Seoul (KR); Eun Ae Lee, Daegu (KR); Joon Ho Cho, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 15/244,046

(22) Filed: Aug. 23, 2016

(65) Prior Publication Data

US 2017/0142606 A1    May 18, 2017

(30) Foreign Application Priority Data

Nov. 13, 2015    (KR) .................. 10-2015-0159835

(51) Int. Cl.
*G01S 3/52* (2006.01)
*H04B 7/08* (2006.01)
(Continued)

(52) U.S. Cl.
CPC .............. *H04B 7/086* (2013.01); *G01S 19/22* (2013.01); *G01S 19/29* (2013.01); *G01S 3/46* (2013.01);
(Continued)

(58) Field of Classification Search
CPC ..... G01S 3/46; G01S 3/48; G01S 3/50; G01S 19/22; G01S 19/24; G01S 19/29; H04B 7/086
(Continued)

(56) References Cited

U.S. PATENT DOCUMENTS

| | | | | |
|---|---|---|---|---|
| 4,975,710 A | * | 12/1990 | Baghdady | ................. G01S 3/46 |
| | | | | 342/433 |
| 5,315,307 A | * | 5/1994 | Tsui | ....................... G01S 7/021 |
| | | | | 342/13 |

(Continued)

FOREIGN PATENT DOCUMENTS

KR    2010-0133830 A    12/2010

OTHER PUBLICATIONS

A. Xenaki et al., "Compressive beamforming", Journal of Acoustical Society of America, vol. 136, No. 1, pp. 260-271, Jul. 2014.

(Continued)

*Primary Examiner* — Chuong P Nguyen
(74) *Attorney, Agent, or Firm* — Rabin & Berdo, P.C.

(57) ABSTRACT

Disclosed are an apparatus and a method for estimating a parameter of a multi path signal. The apparatus for estimating a parameter of a multi path signal includes: a plurality of pre-processing units configured to pre-process respective reception signals received through a plurality of antennas; a plurality of parameter converting units configured to approximate a parameter set of the respective pre-processed reception signals to have a sparse characteristic in a Doppler frequency and angle of arrival domain; and a parameter estimating unit configured to estimate an angle of arrival for a plurality of reception signals in each frequency region of the Doppler frequency and angle of arrival domain.

12 Claims, 4 Drawing Sheets

(51) Int. Cl.
*G01S 19/29* (2010.01)
*G01S 19/22* (2010.01)
*G01S 19/24* (2010.01)
*G01S 3/46* (2006.01)
*G01S 3/48* (2006.01)
*G01S 3/50* (2006.01)

(52) U.S. Cl.
CPC . *G01S 3/48* (2013.01); *G01S 3/50* (2013.01); *G01S 19/24* (2013.01)

(58) Field of Classification Search
USPC .............. 342/418, 444, 445, 357.61, 357.63
See application file for complete search history.

(56) References Cited

U.S. PATENT DOCUMENTS

| | | | | |
|---|---|---|---|---|
| 6,177,907 | B1* | 1/2001 | Golovin | G01S 3/043 |
| | | | | 342/457 |
| 6,894,643 | B2* | 5/2005 | Guo | H04B 7/0851 |
| | | | | 342/372 |
| 6,987,482 | B2* | 1/2006 | Sondur | H04B 7/086 |
| | | | | 342/377 |
| 7,092,673 | B2* | 8/2006 | Bevan | H04W 64/00 |
| | | | | 342/350 |
| 7,495,611 | B2* | 2/2009 | Ruffa | G01S 3/54 |
| | | | | 342/418 |
| 8,531,917 | B2* | 9/2013 | Cui | G01S 3/808 |
| | | | | 367/124 |
| 9,007,258 | B2* | 4/2015 | Kurono | G01S 13/42 |
| | | | | 342/146 |
| 9,207,313 | B2* | 12/2015 | Schuman | G01S 7/28 |
| 9,413,579 | B2* | 8/2016 | Nilsson | H04L 25/0222 |
| 9,496,611 | B2* | 11/2016 | Vagman | H01Q 3/2605 |
| 9,535,151 | B2* | 1/2017 | Lynch | G01S 3/72 |
| 9,921,305 | B2* | 3/2018 | Cao | G01S 7/282 |
| 2008/0316105 | A1 | 12/2008 | Seong et al. | |
| 2012/0105285 | A1 | 5/2012 | Park et al. | |
| 2015/0192656 | A1* | 7/2015 | Werner | G01S 3/46 |
| | | | | 342/352 |
| 2017/0212205 | A1* | 7/2017 | Bialer | G01S 3/48 |
| 2018/0024220 | A1* | 1/2018 | Massarella | G01S 3/74 |

OTHER PUBLICATIONS

J. Gu et al., "Compressed Sensing for DOA Estimation with Fewer Receivers than Sensors", 2011 IEEE International Symposium of Circuits and Systems (ISCAS), pp. 1752-1755, May 15-18, 2011.

* cited by examiner

APPARATUS AND METHOD FOR ESTIMATING PARAMETER OF MULTI PATH SIGNAL

CROSS-REFERENCE TO RELATED APPLICATION

This application claims the benefit of priority to Korean Patent Application No. 10-2015-0159835, filed on Nov. 13, 2015 in the Korean Intellectual Property Office, the disclosure of which is incorporated herein in its entirety by reference.

BACKGROUND OF THE INVENTION

Field of the Invention

The present disclosure relates to an apparatus and a method for estimating a parameter of a multi path signal.

Description of the Related Art

Researches have been conducted to achieve a technology for estimating parameters such as an angle of arrival (hereinafter referred to as 'AoA'), a moving speed of a target, a size and a shape of the target, a propagation delay time, transmitted data, a center frequency of a signal, and a modulation method from a reception signal by using a sensor such as an antenna.

When estimating the AoA of the multi path signal or when including the AoA in a parameter to be estimated, a technology for estimating the parameter may be described by two methods.

A first method is a method for estimating a parameter by using the more antennas or sensors than the number of multi paths. In this case, if the number of antennas or sensors is greater than the number of multi paths, estimation precision of the parameter is improved. However, when using this method, the estimation precision is significantly changed according to the number of the sensors or the antennas.

A second method is a method for estimating a parameter by using the less antennas or sensors than the number of multi paths. For example, when estimating a channel by using a compressive sensing (CS) method, even if the number of multi paths is less than the number of the antennas or the sensors, the AoA of a signal may be estimated with a high precision. However, when using this method, calculation complexity for estimating the parameter is increased.

SUMMARY OF THE INVENTION

The present disclosure has been made in view of the above problems, and provides an apparatus and a method for estimating a parameter of a multi path signal with a high precision while having a low complexity by using less antennas or sensors.

In accordance with an aspect of the present disclosure, an apparatus for estimating a parameter of a multi path signal includes: a plurality of pre-processing units configured to pre-process respective reception signals received through a plurality of antennas; a plurality of parameter converting units configured to approximate a parameter set of the respective pre-processed reception signals to have a sparse characteristic in a Doppler frequency and angle of arrival domain; and a parameter estimating unit configured to estimate an angle of arrival for a plurality of reception signals in each frequency region of the Doppler frequency and angle of arrival domain. The parameter converting unit approximates a candidate group of a Doppler frequency movement amount as a basis component of an FFT matrix, based on a sampling time interval and an FFT size. The parameter converting unit determines a sampling time interval satisfying a following condition:

$$\frac{1}{2T_s} > \max|f_d^k|$$

(where, the Ts represents the sampling time interval, and the $fd^k$ represents a Doppler frequency movement amount of a k-th path signal). The parameter converting unit determines the FFT size having a frequency difference between basis components of the FFT matrix which is smaller than a difference between Doppler frequency movement amounts. The parameter converting unit determines the FFT size satisfying a following condition:

$$\frac{1}{MT_s} > \min|f_d^k - f_d^{k'}|$$

(where, the M represents the number of signals sampled as the Ts, the Ts represents the sampling time interval, and the $fd^k$ represents the Doppler frequency movement amount of a k-th path signal). The parameter converting unit estimates each frequency component for the Doppler frequency movement amount from a signal obtained by approximating the candidate group of Doppler frequency movement amount as the basis component of the FFT matrix. The parameter estimating unit estimates an angle of arrival in a region of each Doppler frequency of a path signal processed to have the sparse characteristic in the Doppler frequency-angle of arrival domain.

In accordance with another aspect of the present disclosure, a method for estimating a parameter of a multi path signal includes: pre-processing respective path signals received through a plurality of antennas; approximating a parameter set of the respective pre-processed path signals to have a sparse characteristic in a Doppler frequency and angle of arrival domain; and estimating an angle of arrival for a plurality of reception signals in each frequency region of the Doppler frequency and angle of arrival domain. Approximating a parameter set of the respective pre-processed path signals includes approximating a candidate group of a Doppler frequency movement amount as a basis component of an FFT matrix, based on a sampling time interval and an FFT size. Approximating a parameter set of the respective pre-processed path signals includes determining a sampling time interval satisfying a following condition:

$$\frac{1}{2T_s} > \max|f_d^k|$$

(where, the Ts represents the sampling time interval, and the $fd^k$ represents a Doppler frequency movement amount of a k-th path signal). Approximating a parameter set of the respective pre-processed path signals includes determining the FFT size having a frequency difference between basis components of the FFT matrix which is smaller than a difference between Doppler frequency movement amounts. Determining the FFT size includes determining the FFT size satisfying a following condition:

$$\frac{1}{MT_s} > \min|f_d^k - f_d^{k'}|$$

(where, the M represents the number of signals sampled as the Ts, the Ts represents the sampling time interval, and the $fd^k$ represents the Doppler frequency movement amount of a k-th path signal). Approximating a parameter set of the respective pre-processed path signals includes estimating each frequency component for the Doppler frequency movement amount from a signal obtained by approximating the candidate group of Doppler frequency movement amount as the basis component of the FFT matrix. Estimating an angle of arrival for a plurality of reception signals includes estimating an angle of arrival in a region of each Doppler frequency of a path signal processed to have the sparse characteristic in the Doppler frequency-angle of arrival domain.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
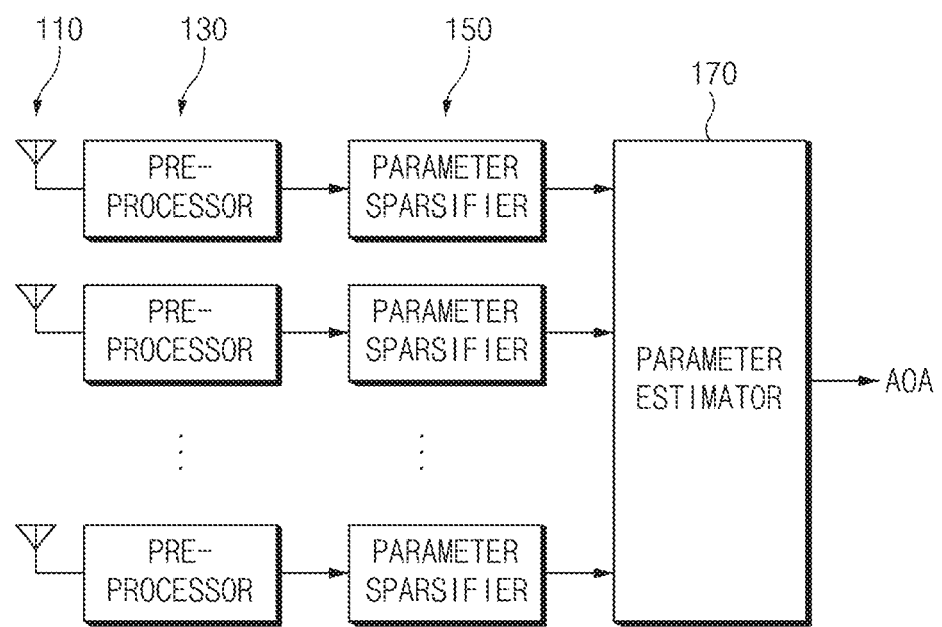
FIG. 1 is a diagram illustrating a configuration of an apparatus for estimating a parameter of a multi path signal according to an embodiment of the present disclosure.

FIG. 1 is a diagram illustrating a configuration of an apparatus for estimating a parameter of a multi path signal according to an embodiment of the present disclosure;

Referring to FIG. 1, the apparatus for estimating a parameter of a multi path signal according to an embodiment of the present disclosure (hereinafter referred to as 'parameter estimating apparatus') may include an antenna 110, a pre-processing unit 130, a parameter converting unit 150, and a parameter estimating unit 170.

In this case, a plurality of antennas 110, pre-processing units 130, and parameter converting units 150 may be provided. For example, K antennas 110, K pre-processing units 130, and K parameter converting units 150 may be provided, and K antennas 110 may receive L multi path signals.

The antenna 110 may serve to receive a signal of a specific path channel. The antenna 110 may be replaced with a sensor. The parameter estimating apparatus according to the present disclosure may realize K antennas 110 or sensors in the form of a uniform linear array (ULA). However, in the below description of an embodiment according to the present disclosure, it is implemented as the antenna 110.

For example, when a center frequency of a signal transmitted through a multi path channel is fc, a reception signal received through a K-th antenna 110 may be expressed by a following Equation 1.

$$y_k(t) = \sum_{l=1}^{L} a_l e^{j2\pi(f_c + f_d^l)t + j(k-1)\pi\cos\theta_l} + N_k(t) \quad \text{[Equation 1]}$$

where, the $\theta l$ represents an AoA of a l-th path signal, $f_d^l$ the represents a Doppler frequency movement amount of the l-th path signal, the al represent a channel gain of the l-th path signal, and the Nk(t) represents white Gaussian noise.

The pre-processing units 130 may serve to pre-process the reception signal received by any a single corresponding antenna among the K antennas 110. In this case, the pre-processing units 130 may include a down converter, a reception filter, a sampler, and a serial-to-parallel converter.

The reception signal $y_k(t)$ of Equation 1 may be sampled with a Ts interval by the sampler after passing through the down converter and the reception filter of the pre-processing units 130. M signals sampled with the Ts interval may be expressed by a following Equation 2.

$$\tilde{y}_k(mT_s) = \sum_{l=1}^{L} a_l e^{j2\pi f_d^l mT_s + j(k-1)\pi\cos\theta_l} + \tilde{N}_k(mT_s) \quad \text{[Equation 2]}$$

where, the m may represent an integer number between 0 and M−1.

In this case, M signals may be defined by a vector having a length M as illustrated in Equation 3.

$$\underline{\tilde{y}}_k = W_{f_d} D_\theta^{(k-1)} \underline{\alpha} + \underline{N}_k$$

where, the W represents a Doppler frequency movement amount, which may be expressed as a following matrix.

$$W_{f_d} \triangleq \begin{bmatrix} 1 & 1 & \cdots & 1 \\ e^{j2\pi f_d^1 T_s} & e^{j2\pi f_d^2 T_s} & \cdots & e^{j2\pi f_d^L T_s} \\ \vdots & \vdots & \ddots & \vdots \\ e^{j2\pi f_d^1 (M-1)T_s} & e^{j2\pi f_d^2 (M-1)T_s} & \cdots & e^{j2\pi f_d^L (M-1)T_s} \end{bmatrix},$$

D represents a matrix including an AoA θ, which may be expressed as $$D_\theta^{(k-1)} \triangleq \text{diag}\left\{\begin{bmatrix} e^{j(k-1)\pi\cos\theta_1} \\ e^{j(k-1)\pi\cos\theta_2} \\ \vdots \\ e^{j(k-1)\pi\cos\theta_L} \end{bmatrix}\right\}.$$

Further, the represents a gain of a multi path signal, which may be expressed as $$a \triangleq \begin{bmatrix} a_1 \\ a_2 \\ \vdots \\ a_L \end{bmatrix}.$$

The parameter converting unit 150 may serve to make the parameters included in each reception signal pre-processed by the pre-processing units 130 to be sparse. In other words, the parameter converting unit 150 may process a parameter set of each pre-processed reception signal to have a sparse characteristic in a specific domain. In this case, the parameter set may include an angle of arrival (AoA) and a Doppler frequency. In this case, since the parameter set has a sparse characteristic in the specific domain, it may be easy to estimate the AoA by the parameter estimating unit 170.

For example, the parameter converting unit 150 may be a fast Fourier transform (FFT) unit to make the pre-processed reception signal to be sparse in a Doppler-AoA domain.

The parameter converting unit 150 may determine a sampling time interval and a FFT size in order to approximate a candidate group of a Doppler frequency movement amount as a basis component of an FFT matrix. In this case, the sampling time interval should be determined as a great value enough to extract a maximum value of the Doppler frequency movement amount. For example, the parameter converting unit 150 may determine the sampling time interval as a value for satisfying a condition of a following Equation 4.

$$\frac{1}{2T_s} > \max |f_d^k| \quad \text{[Equation 4]}$$

In addition, in order to clearly classify the Doppler frequency movement amount, a frequency difference between basis components of the FFT matrix should be sufficiently smaller than a difference between Doppler frequency movement amounts. Accordingly, the FFT should have a great sampling size enough to classify a difference of Doppler frequencies. For example, the parameter converting unit 150 may determine an FFT having a sampling number which satisfies a condition of a following Equation 5.

$$\frac{1}{MT_S} > \min |f_d^k - f_d^{k'}| \quad \text{[Equation 5]}$$

Accordingly, the parameter converting unit 150 may approximate a candidate group of the Doppler frequency movement amount as a basis component of an FFT matrix, based on the previously determined sampling time interval and FFT size. In this case, the Doppler frequency movement amount approximated as the basis component of the FFT matrix may be expressed by a following Equation 6.

$$W_{f_d} \triangleq \begin{bmatrix} 1 & 1 & \cdots & 1 \\ e^{j2\pi f_d^1 T_s} & e^{j2\pi f_d^2 T_s} & \cdots & e^{j2\pi f_d^L T_s} \\ \vdots & \vdots & \ddots & \vdots \\ e^{j2\pi f_d^1 (M-1)T_s} & e^{j2\pi f_d^2 (M-1)T_s} & \cdots & e^{j2\pi f_d^L (M-1)T_s} \end{bmatrix} \quad \text{[Equation 6]}$$

$$\approx \begin{bmatrix} 1 & 1 & \cdots & 1 \\ 1 & e^{j2\pi/M} & \cdots & e^{j2\pi(M-1)/M} \\ \vdots & \vdots & \ddots & \vdots \\ 1 & e^{j2\pi(M-1)/M} & \cdots & e^{j2\pi(M-1)(M-1)/M} \end{bmatrix}$$

$$P_\pi \begin{bmatrix} I_L \\ 0_{(M-L) \times L} \end{bmatrix}$$

When the Doppler frequency movement amount is approximated through Equation 6, the parameter converting unit 150 may precisely estimate each frequency component for the Doppler frequency movement amount of the reception signal. In this case, the parameter converting unit 150 may estimate each frequency component of the Doppler frequency movement amount as illustrated in Equation 7.

$$z_n = W_M \tilde{y}_n = \begin{bmatrix} z_{n,0} \\ z_{n,1} \\ \vdots \\ z_{n,M/2-1} \\ z_{n,M/2} \\ \vdots \\ z_{n,M-1} \end{bmatrix} \quad \text{[Equation 7]}$$

As illustrated in Equation 7, the Doppler frequency movement amount may be classified as respective frequency components. In this case, a $z_{n,0}$ component may represent a DC component when a Doppler frequency is approximated to 0. Further, a $z_{n,1}$ component may represent a 1/MTs component when a Doppler frequency is approximated to 1/MTs. Moreover, a $z_{n,(M/2)-1}$ component represents a (½ Ts-1/MTs) component when the Doppler frequency is approximated to ½ Ts. Further, a $z_{n,M/2}$ component represents a −½ Ts component when the Doppler frequency is approximated to −½ Ts. Further, a $z_{n,M-1}$ component represents a −1/mTs component when the Doppler frequency is approximated to −1/mTs.

Accordingly, the parameter estimating unit 170 may estimate the AoA of a multi path signal for each frequency component estimated by the parameter converting unit 150.

The parameter estimating unit 170 may serve to estimate the AoA from the reception signal which is processed in such a manner that the parameter has a sparse characteristic in a specific domain. In this case, the parameter estimating unit 170 may correspond to a conjugate beamforming (CBF) unit, a multiple signal classification (MUSIC) unit, estimation of signal parameters via rotation invariance techniques (ESPRIT), a minimum variance distortionless response (MVDR) unit or a compressive sensing (CS) unit.

In this case, the parameter estimating unit 170 may estimate the AoA of a reception signal in each parameter region. For example, the parameter estimating unit 170 may estimate the AoA of a signal in each Doppler frequency region when the signal is processed to have a sparse characteristic in a Doppler-AoA domain.

For example, when performing FFT for a sampled vector, a path signal to received by a single antenna 110 may be classified by the Doppler frequency movement amount. Assuming that a single classified path exists maximally within each frequency bin divided by the FFT, the parameter estimating unit 170 may easily estimate the AoA of the multi path signal by using a phase difference of the signal received by K antennas 110.

Hereinafter, an operation of estimating the AoA of a multi path signal by the parameter estimating unit 170 is described according to embodiments.

<First Embodiment>—Example of Estimating an AoA of a Multi Path Signal by Using Two Antennas When receiving a multi path signal by using two antennas, each path signal may be approximated by using the FFT and may be simply expressed as a least square optimization problem as illustrated in a following Equation 8.

$$\underset{D, \hat{z}_1}{\text{minimize}} \|z_1 - \hat{z}_1\|^2 + \|z_2 - D\hat{z}_1\|^2 \quad \text{[Equation 8]}$$

where, the $\hat{z}_1$ is an estimation value of $z_1$, which represents a size for each Doppler frequency, and the D represents a phased containing AoA information for each Doppler frequency.

In Equation 8, the $z_1$ represents a vector obtained by performing FFT for a vector having a length M received by a first antenna, and the $z_2$ represents a vector obtained by performing FFT for a vector having a length M received by a second antenna.

The parameter estimating unit 170 may estimate the $\hat{z}_1$. Each entry of a vector may be configured of an eigen value that has a basis component of an FFT matrix as an eigenvector. In this case, a location of each entry represents a component size of a corresponding Doppler frequency movement amount.

Assuming that a diagonal matrix D containing the AoA information of the multi path signal is known so as to solve the optimal problem of Equation 8, the parameter estimating unit 170 may obtain a first order necessary condition (FONC) by differentiating an objective function and may obtain an optimal $\hat{z}_1$ as illustrated in a following Equation 9 from the solution.

$$\hat{z}_1 = \tfrac{1}{2}(z_1 + D^{\mathcal{H}} z_2) \quad \text{[Equation 9]}$$

When substituting Equation 8 with the $\hat{z}_1$ of Equation 9, it may be expressed by an equation of only a diagonal matrix D as illustrated in a following Equation 10.

$$\underset{D}{\text{minimize}} \|z_1 - D^{\mathcal{H}} z_2\|^2 + \|z_2 - D z_1\|^2 = \quad \text{[Equation 10]}$$
$$\underset{D}{\text{minimize}} \|z_2 - D z_1\|^2$$

The parameter estimating unit 170 may easily obtain a solution through Equation 10. The solution obtained through Equation 10 may be expressed by a following Equation 11.

$$\angle z_2 = \angle D z_1 \quad \text{[Equation 11]}$$

where, $$D = \text{diag}\left\{ e^{-j\pi \cos\angle\left(\frac{z_{1,0}}{z_{2,0}}\right)}, e^{-j\pi \cos\angle\left(\frac{z_{1,1}}{z_{2,1}}\right)}, \ldots, e^{-j\pi \cos\angle\left(\frac{z_{1,M-1}}{z_{2,M-1}}\right)} \right\}$$

As a result, when using a signal which performed FFT after sampling a to path signal received by the first antenna and the second antenna with a sufficiently narrow interval, the parameter estimating unit 170 may easily estimate a Doppler frequency movement amount and an AoA of the multi path signal by following Equations 12 and 13.

$$\hat{z}_1 = \tfrac{1}{2}(z_1 + D^{\mathcal{H}} z_2) \quad \text{[Equation 12]}$$

<Second Embodiment> Example of Estimating Two Multi Path Signals Having a Different Doppler Frequency Movement Amount and AoA by Using Two Antennas First, in order to estimate the Doppler frequency and AoA of two multi path signals by using two antennas, it may be assumed as follows.

\# of path=2 with θ1, θ2
Doppler frequency: fd1=0, fd2=−50
Path of gain: a1=a2=1
M=4, Ts=1/100 [sec]

If it is assumed as described above, the parameter estimating unit 170 may easily estimate the Doppler frequency movement amount and the AoA as illustrated in a following Equation 13 by using a vector component configured by a signal received by the second antenna.

$$z_2 = W_M \hat{y}_2 \quad \text{[Equation 13]}$$
$$= \begin{bmatrix} z_{2,0} \\ z_{2,1} \\ z_{2,2} \\ z_{2,3} \end{bmatrix}$$
$$= \begin{bmatrix} z_{1,0} e^{-j\pi\cos\hat{\theta}_0} \\ z_{1,1} e^{-j\pi\cos\hat{\theta}_1} \\ z_{1,2} e^{-j\pi\cos\hat{\theta}_2} \\ z_{1,3} e^{-j\pi\cos\hat{\theta}_3} \end{bmatrix}$$
$$= \begin{bmatrix} e^{-j\pi\cos\hat{\theta}_1} \\ 0 \\ e^{-j\pi\cos\hat{\theta}_2} \\ 0 \end{bmatrix}$$

<Third Embodiment> Example of Estimating an AoA of a Multi Path Signal for Each Frequency by Using K Antennas The third embodiment relates to a method of estimating the AoA of a multi path signal for each frequency when the number of antennas is K by extending the result of the first embodiment.

If it is defined that $z_k$ is a vector obtained by performing FFT for a signal received by a K-th antenna, a joint Doppler-AoA estimation problem may be approximated as a least square problem to be expressed by a following Equation 14.

$$\underset{D, \hat{z}_1}{\text{minimize}} \sum_{k=1}^{K} \|z_k - D^{k-1} \hat{z}_1\|^2 \quad \text{[Equation 14]}$$

where, $$D^0 \triangleq I, \; D^{k-1} \triangleq DD^{k-2}, \text{ and}$$

-continued $$D \triangleq \text{diag}\left(e^{-j\pi\cos\theta_0}, e^{-j\pi\cos\theta_1}, \ldots, e^{-j\pi\cos\theta_{M-1}}\right).$$

The parameter estimating unit 170 may calculate $\hat{z}_1$ satisfying a first order necessary condition (FONC) by a following Equation 15.

$$\hat{z}_1 = \frac{1}{K}\left(z_1 + D^{\mathcal{H}}z_2 + (D^{\mathcal{H}})^2 z_3 + \cdots + (D^{\mathcal{H}})^{K-1} z_K\right) \quad \text{[Equation 15]}$$

$$= \frac{1}{K}\sum_{k=1}^{K} (D^{\mathcal{H}})^{k-1} z_k$$

In this case, the parameter estimating unit 170 may calculate an optimization equation as a following Equation 16 by substituting Equation 14 with Equation 15.

$$\underset{D}{\text{minimize}} \sum_{k=1}^{K} \left\| z_k - D^{k-1} \frac{1}{K} \sum_{k'=1}^{K} (D^{\mathcal{H}})^{k'-1} z'_k \right\|^2 = \quad \text{[Equation 16]}$$

$$\left\| z_K - \sum_{k=1}^{K-1} D^{K-k} z_k \right\|^2$$

Accordingly, the parameter estimating unit 170 may simultaneously estimate the Doppler frequency movement amount and the AoA of a path signal as illustrated in a following Equation 17 by using Equation 16.

$$\underset{\theta_m}{\text{minimize}} \left| z_{K,m} - \sum_{k=1}^{K-1} e^{-j\pi(K-k)\cos\theta_m} z_{k,m} \right|^2 \quad \text{[Equation 17]}$$

Where, $m = \{0, 1, 2, \ldots, M-1\}$.

Unlike the case of estimating the Doppler-AoA by using two antennas as illustrated in the first embodiment and the second embodiment, in the case of to estimating the Doppler-AoA by using K antennas as illustrated in the third embodiment, the solution has a closed form and does not appear at once.

However, in the case of the third embodiment, as illustrated in Equation 17, since a solution may be obtained by solving M line search problems, the calculation complexity of the problem is not still great.

As illustrated in the first embodiment and the second embodiment, since the parameter estimating apparatus according to the present disclosure may preferentially classify a multi path signal by using the Doppler frequency movement amount between multi path signals, even if less antennas or sensors are used, the AoA of a plurality of multi path signals may be estimated with a high precision. In addition, the parameter estimating apparatus according to the present disclosure may require a low calculation complexity for the optimization problem to be solved for the Doppler-AoA estimation. In particular, a solution of the optimization problem can be immediately obtained by using only two antennas so that there is almost no calculation burden for obtaining an optimal solution.

An operation flow of the parameter estimating apparatus according to the present disclosure configured as described above is described in detail.

Figure 2:
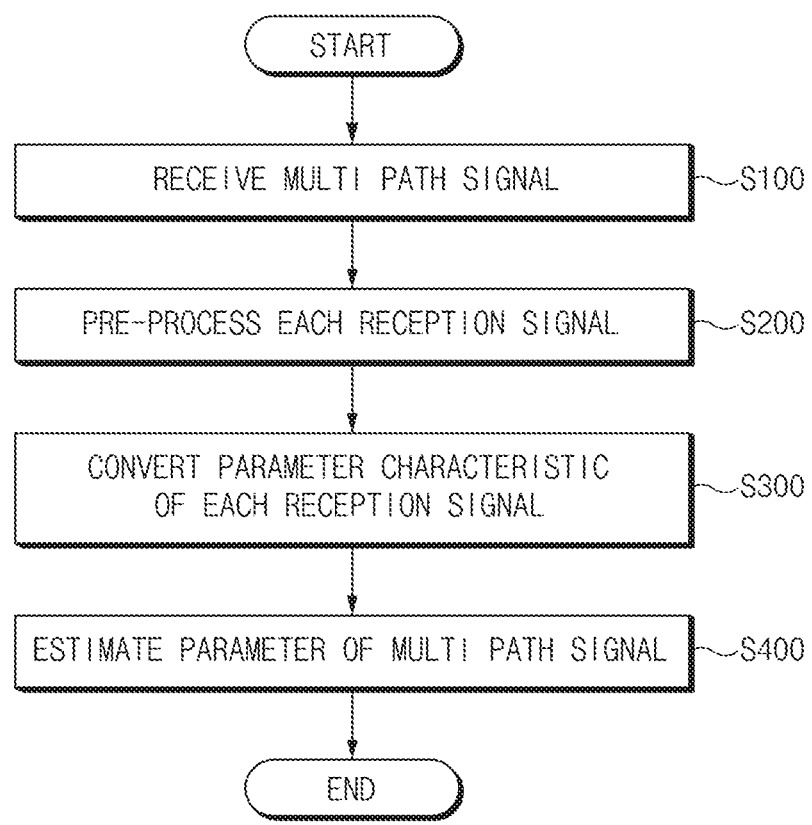
FIG. 2 is a flowchart illustrating a method for estimating a parameter of a multi path signal according to an embodiment of the present disclosure.
Figure 3:
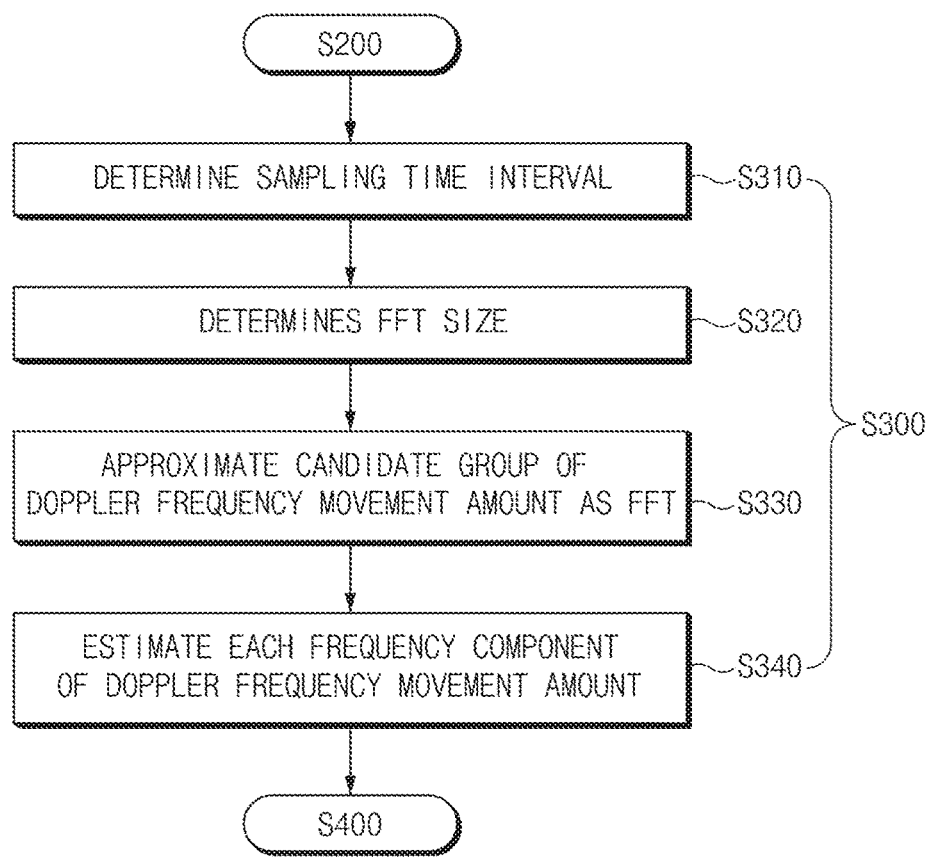
FIG. 3 is a flowchart illustrating a detailed operation for a parameter approximation process shown in FIG. 2.

FIG. 2 illustrates an operation flow of a method for estimating a parameter, and FIG. 3 illustrates a detailed operation flow in a step of changing a parameter characteristic.

Referring to FIG. 2 and FIG. 3, the parameter estimating apparatus may receive L path signals by using K antennas. In this case, the signal received through K antennas may be transferred to a pre-processing unit 130 corresponding to each antenna. Each pre-processing unit 130 may pre-process a reception signal by using a down converter, a reception filter, a sampler, and a serial-to-parallel converter (S200). The signal pre-processed in step S200 may be transferred to the parameter converting unit 150 corresponding to each pre-processing unit 130.

Each parameter converting unit 150 may convert a parameter set included in the pre-processed reception signal to have a sparse characteristic in a specific domain (S300).

In this case, each parameter converting unit 150 may determine a sampling time interval and an FFT size (S310, S320) as illustrated in FIG. 3 during the step S300. In addition, each parameter converting unit 150 may approximate the candidate group of Doppler frequency movement amount as a basis component of the FFT matrix based on the determined sampling time interval and FFT size (S330). In this case, each parameter converting unit 150 may estimate each frequency component for the Doppler frequency movement amount of a reception signal (S340).

Each parameter converting unit 150 may transfer the approximated signal to the parameter estimating unit 170 together with each frequency component information for each Doppler frequency movement amount.

The parameter estimating unit 170 may estimate the AoA of a multi path signal for each frequency component estimated in the step S340 (S400).

A detailed algorithm and Equations for performing the steps S100 to S400 are explained in the above description of FIG. 1.

The apparatus for estimating a parameter of a multi path signal according to the present embodiment operated as described above may be implemented in the form of an independent hardware device. The pre-processing unit 130, the parameter converting unit 150, and the parameter estimating unit 170 of the apparatus for estimating a parameter of a multi path signal may be realized as respective processors. Meanwhile, the apparatus for estimating a parameter of a multi path signal may be driven as at least one processor while being included in other hardware device such as a micro-processor or a general-purpose computer system.

Figure 4:
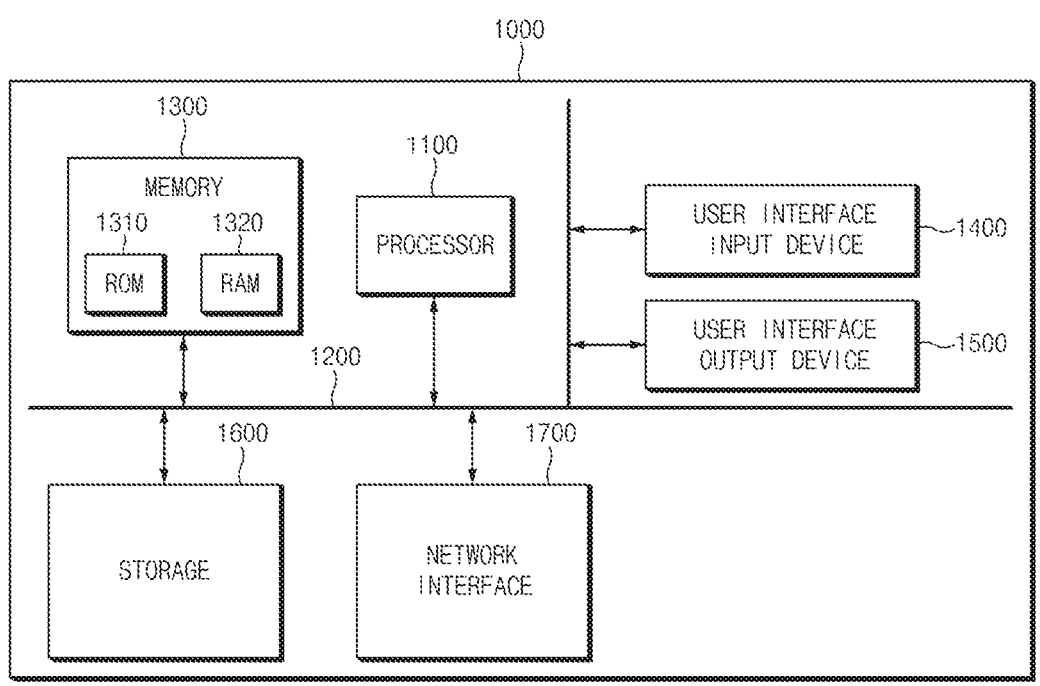
FIG. 4 is a diagram illustrating a configuration of a computing system implementing the apparatus according to an embodiment of the present disclosure.

FIG. 4 is a diagram illustrating a configuration of a computing system implementing the apparatus according to the present disclosure.

Referring to FIG. 4, the computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) 1310 and a Random Access Memory (RAM) 1320.

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

The present disclosure may estimate a parameter of a multi path signal with a high precision while having a low complexity by using less antennas or sensors.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for estimating a parameter of a multi path signal, the apparatus comprising:
    a plurality of pre-processing units configured to pre-process respective reception signals received through a plurality of antennas;
    a plurality of parameter converting units configured to approximate a parameter set of the respective pre-processed reception signals to have a sparse characteristic in a Doppler frequency and angle of arrival domain; and
    a parameter estimating unit configured to estimate an angle of arrival for a plurality of reception signals in each frequency region of the Doppler frequency and angle of arrival domain,
    wherein the parameter converting unit approximates a candidate group of a Doppler frequency movement amount as a basis component of an FFT matrix, based on a sampling time interval and an FFT size.

2. The apparatus of claim 1, wherein the parameter converting unit determines a sampling time interval satisfying a following condition:

$$\frac{1}{2T_s} > \max|f_d^k|$$

(where, the Ts represents the sampling time interval, and the fd$^k$ represents the Doppler frequency movement amount of a k-th path signal).

3. The apparatus of claim 1, wherein the parameter converting unit determines the FFT size having a frequency difference between basis components of the FFT matrix which is smaller than a difference between Doppler frequency movement amounts.

4. The apparatus of claim 1, wherein the parameter converting unit determines the FFT size satisfying a following condition:

$$\frac{1}{MT_s} > \min|f_d^k - f_d^{k'}|$$

(where, the M represents a number of signals sampled as the Ts, the Ts represents the sampling time interval, and the fd$^k$ represents the Doppler frequency movement amount of a k-th path signal).

5. The apparatus of claim 1, wherein the parameter converting unit estimates each frequency component for the Doppler frequency movement amount from a signal obtained by approximating the candidate group of the Doppler frequency movement amount as the basis component of the FFT matrix.

6. The apparatus of claim 1, wherein the parameter estimating unit estimates an angle of arrival in a region of each Doppler frequency of a path signal processed to have the sparse characteristic in the Doppler frequency and angle of arrival domain.

7. A method for estimating a parameter of a multi path signal, performed by an apparatus comprising a processor and a memory in which one or more commands executed by the processor are stored, the method comprising:
    pre-processing, by the processor, respective path signals received through a plurality of antennas;
    approximating, by the processor, a parameter set of the respective pre-processed path signals to have a sparse characteristic in a Doppler frequency and angle of arrival domain; and
    estimating, by the processor, an angle of arrival for a plurality of reception signals in each frequency region of the Doppler frequency and angle of arrival domain,
    wherein approximating a parameter set of the respective pre-processed path signals comprises approximating a candidate group of a Doppler frequency movement amount as a basis component of an FFT matrix, based on a sampling time interval and an FFT size.

8. The method of claim 7, wherein approximating a parameter set of the respective pre-processed path signals comprises determining, by the processor, a sampling time interval satisfying a following condition:

$$\frac{1}{2T_s} > \max|f_d^k|$$

(where, the Ts represents the sampling time interval, and the fd$^k$ represents the Doppler frequency movement amount of a k-th path signal).

9. The method of claim 7, wherein approximating a parameter set of the respective pre-processed path signals comprises determining, by the processor, the FFT size having a frequency difference between basis components of the FFT matrix which is smaller than a difference between Doppler frequency movement amounts.

10. The method of claim 9, wherein determining the FFT size comprises determining the FFT size satisfying a following condition:

$$\frac{1}{MT_s} > \min|f_d^k - f_d^{k'}|$$

(where, the M represents a number of signals sampled as the Ts, the Ts represents the sampling time interval, and the $fd^k$ represents the Doppler frequency movement amount of a k-th path signal).

11. The method of claim 7, wherein approximating a parameter set of the respective pre-processed path signals comprises estimating, by the processor, each frequency component for the Doppler frequency movement amount from a signal obtained by approximating the candidate group of the Doppler frequency movement amount as the basis component of the FFT matrix.

12. The method of claim 7, wherein estimating an angle of arrival for a plurality of reception signals comprises estimating an angle of arrival in a region of each Doppler frequency of a path signal processed to have the sparse characteristic in the Doppler frequency and angle of arrival domain.

* * * * *